(12) United States Patent
Lei

(10) Patent No.: US 12,477,422 B2
(45) Date of Patent: Nov. 18, 2025

(54) NETWORK HANDOVER PROCESSING METHOD, APPARATUS, COMPUTER READABLE MEDIUM, ELECTRONIC DEVICE, AND COMPUTER PROGRAM PRODUCT

(71) Applicant: TENCENT TECHNOLOGY (SHENZHEN) COMPANY LIMITED, Guangdong (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 325 days.

(21) Appl. No.: 18/347,653

(22) Filed: Jul. 6, 2023

(65) Prior Publication Data
US 2023/0388880 A1    Nov. 30, 2023

Related U.S. Application Data

(63) Continuation of application No. PCT/CN2022/130937, filed on Nov. 9, 2022.

(30) Foreign Application Priority Data

Dec. 31, 2021   (CN) .......................... 202111676221.7

(51) Int. Cl.
*H04W 36/08*    (2009.01)
*H04W 36/00*    (2009.01)

(52) U.S. Cl.
CPC ....... *H04W 36/08* (2013.01); *H04W 36/0055* (2013.01)

(58) Field of Classification Search
CPC ........... H04W 36/08; H04W 36/00837; H04W 28/0268; H04W 36/0055; H04W 24/02; H04W 36/26; H04W 40/36; H04W 36/0033; H04L 47/2416
See application file for complete search history.

(56) References Cited

U.S. PATENT DOCUMENTS

| | | | |
|---|---|---|---|
| 2020/0396658 A1* | 12/2020 | Szilagyi | H04W 36/0058 |
| 2021/0058826 A1* | 2/2021 | Mao | H04W 28/0933 |
| 2021/0250838 A1* | 8/2021 | Lu | H04W 76/11 |
| 2023/0246900 A1* | 8/2023 | Zhang | H04L 41/044 |
| | | | 709/223 |
| 2023/0354141 A1* | 11/2023 | Lei | H04W 36/0044 |

(Continued)

*Primary Examiner* — Congvan Tran
(74) *Attorney, Agent, or Firm* — Sughrue Mion, PLLC

(57) ABSTRACT

A network handover processing system and method including: receiving service real-time requirement information provided by an application side, the service real-time requirement information being used for indicating a timeliness requirement of services processed between user equipment and the application side; receiving a notification message from a network data analytics function entity; generating, based on the service real-time requirement information, a handover policy to be followed by an access network entity connected to the user equipment in the event of handover upon receiving the notification message; and transmitting the handover policy to a session management function entity to enable the session management function entity to configure the handover policy to other network entities.

20 Claims, 8 Drawing Sheets

(56) References Cited

U.S. PATENT DOCUMENTS

| | | | |
|---|---|---|---|
| 2023/0388823 A1* | 11/2023 | Xu | H04W 40/04 |
| 2024/0267800 A1* | 8/2024 | Pan | G06N 20/00 |
| 2024/0365421 A1* | 10/2024 | Harmatos | H04L 41/06 |

* cited by examiner

… (1)

NETWORK HANDOVER PROCESSING METHOD, APPARATUS, COMPUTER READABLE MEDIUM, ELECTRONIC DEVICE, AND COMPUTER PROGRAM PRODUCT

RELATED APPLICATION

This application is a continuation application of International Application number PCT/CN2022/130937 filed on Nov. 9, 2022, which claims priority to Chinese Patent Application No. 202111676221.7, filed on Dec. 31, 2021, which are hereby incorporated by reference in their entireties.

FIELD

This application relates to the field of computer and communication technologies, and specifically, to a network handover processing method, apparatus, computer readable medium, electronic device, and computer program product.

BACKGROUND

There are two networking modes for the 5G system: Non-Standalone (NSA) and Standalone (SA). Handover mechanisms have also been introduced in these two networking modes, such as handover of access network equipment (such as a base station) connected to User Equipment (UE). To ensure the handover performance, various handover mechanisms have been introduced in related technologies, but all of them have the problem of high cost.

SUMMARY

Embodiments of this application provide a network handover processing method, apparatus, computer readable medium, electronic device, and computer program product, which in turn can ensure, at least to some extent, that the handover policy matches the actual service real-time requirement information, and avoid incurring larger handover costs.

Other characteristics and advantages of this application will become obvious through the following detailed description or partially learned through the practice of this application.

Some embodiments of this application provides a network handover processing method, including: receiving service real-time requirement information provided by an application side, the service real-time requirement information being used for indicating a timeliness requirement of services processed between user equipment and the application side; receiving a notification message from a network data analytics function entity, the notification message being transmitted by the network data analytics function entity after determining that a handover delay of an access network entity connected to the user equipment in the event of handover exceeds a set threshold; generating, based on the service real-time requirement information, a handover policy to be followed by an access network entity connected to the user equipment in the event of handover upon receiving the notification message; transmitting the handover policy to a session management function entity to enable the session management function entity to configure the handover policy to other network entities.

In the technical solution provided in some embodiments of this application, the policy control function entity generates a handover policy to be followed by an access network entity connected to the user equipment in the event of handover by receiving the service real-time requirement information provided by the application side and based on the service real-time requirement information upon receiving the notification message from the network data analytics function entity; and then transmits the handover policy to a session management function entity to enable the session management function entity to configure the handover policy to other network entities, so that the handover policy to be followed by the access network entity in the event of handover can be flexibly adjusted according to the service real-time requirement information, which thus can ensure that the handover policy matches the actual service real-time requirement information, save data cache resources required for network handover, reduce the cost of forwarding operations during network handover, and avoid incurring larger handover costs.

It is to be understood that, the foregoing general descriptions and the following detailed descriptions are merely exemplary and explanatory and are not intended to limit this application.

DETAILED DESCRIPTION

Figure 1:
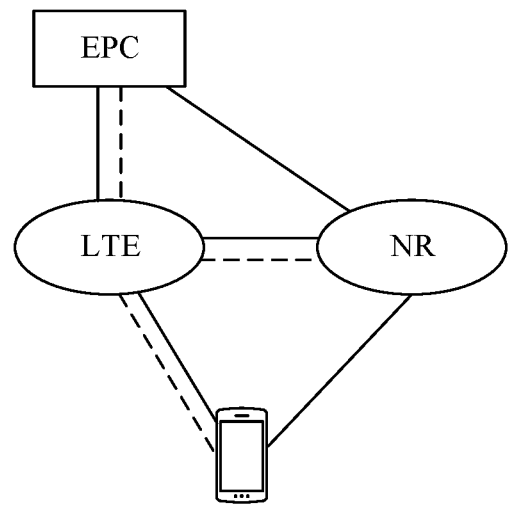
FIG. 1 shows a schematic diagram of one networking mode for the 5G system.

In order to make objects, technical solutions, and advantages of the disclosure more obvious, certain embodiments according to the disclosure are described in detail below with reference to the drawings. The described embodiments are not to be construed as a limitation to the present disclosure. All other embodiments obtained by a person of ordinary skill in the art without creative efforts shall fall within the protection scope of the present disclosure and accompanying claims.

In the following descriptions, related "some embodiments" describe a subset of all possible embodiments. However, it may be understood that the "some embodiments" may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects unless otherwise noted or the context suggests otherwise.

Operation

The block diagrams shown in the accompanying drawings are merely function entities and do not necessarily correspond to physically independent entities. That is, the function entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations, and do not need to be performed in the described order either. For example, some operations may be further divided, while some operations may be combined or partially combined. Therefore, an actual execution order may change according to an actual case.

It is to be explained that: the "plurality of" mentioned in the specification means two or more. "And/or" describes the association relationship of the associated object, indicating that there can be three types of relationships, for example, A and/or B can represent: the existence of A alone, the existence of A and B simultaneously, and the existence of B alone. The character "/" generally indicates an "or" relationship between the associated objects.

Unless otherwise defined, meanings of all technical and scientific terms used in this specification are the same as those usually understood by a person skilled in the art to which this application belongs. The terms used in the specification are merely intended to describe objectives of some embodiments of the disclosure, but are not intended to limit the disclosure.

Before some embodiments of the disclosure are illustrated in further detail, the nouns and terms involved in some embodiments of the disclosure are illustrated, and the nouns and terms involved in some embodiments of the disclosure are applicable to the following explanation.

1) Entity: a generic term for various types of devices (including node machine devices, communication devices, terminal devices, storage devices, power supply systems, etc.) and other hardware devices that serve this purpose in a computer network.
2) Data forwarding: the processor copies the output value content of one unit to the input value of another unit, and in some embodiments of the disclosure, the data forwarding refers to the forwarding of cached data from the base station before handover to the base station after handover.
3) Based on: indicates a condition or state on which the performed operation depends, the one or more operations performed may be real-time or may also have a set delay when the dependent condition or state is satisfied;

Unless otherwise specified, there is no limitation on the order of execution of the multiple operations performed.

Some embodiments of the disclosure provide a network handover processing method, including: receiving a handover policy from a policy control function entity, the handover policy representing a policy to be followed by an access network entity connected to user equipment in the event of handover, the handover policy being generated by the policy control function entity according to service real-time requirement information provided by an application side upon receiving a notification message from a network data analytics function entity, the service real-time requirement information being used for indicating a timeliness requirement of services processed between the user equipment and the application side, and the notification message being transmitted by the network data analytics function entity after determining that a handover delay of an access network entity connected to the user equipment in the event of handover exceeds a set threshold; configuring the handover policy to other network entities to enable the other network entities to perform a handover operation based on the handover policy in the event of handover of the access network entity.

Some embodiments of the disclosure provide a network handover processing apparatus, including: a first receiving unit configured to receive service real-time requirement information provided by an application side and to receive a notification message from a network data analytics function entity, the service real-time requirement information being used for indicating a timeliness requirement of services processed between the user equipment and the application side, the service real-time requirement information being generated by the network data analytics function entity according to an analysis of the service, and the notification message being transmitted by the network data analytics function entity after determining that a handover delay of an access network entity connected to the user equipment in the event of handover exceeds a set threshold; a generation unit configured to generate, based on the service real-time requirement information, a handover policy to be followed by an access network entity connected to the user equipment in the event of handover upon receiving the notification message; and a transmitting unit configured to transmit the handover policy to a session management function entity to enable the session management function entity to configure the handover policy to other network entities.

In some embodiments of the disclosure, the first receiving unit is configured to: receive service real-time requirement information forwarded by a network exposure function entity from the application side; or receive service real-time requirement information directly from the application side.

In some embodiments of the disclosure, the handover policy includes at least one of the following:
whether data forwarding processing is required in the event of handover;
a handover delay that can be tolerated in the event of handover;
context transfer requirements for the source and destination sides in the event of handover, the context transfer requirements including a full configuration, a partial configuration or a delta configuration;
whether the user equipment performing a make before break policy or a break before make policy in the event of handover.

In some embodiments of the disclosure, the service real-time requirement information includes at least one of the following: total service transmission delay that can be tolerated, and valid time of transmitted service packets.

In some embodiments of the disclosure, the generation unit is configured to: generate a handover policy containing time thresholds corresponding to each network entity based on the service real-time requirement information, to instruct said each network entity to discard cached data and stop data forwarding processing after monitoring that the handover duration exceeds a corresponding time threshold.

In some embodiments of the disclosure, the generation unit is configured to: based on determining that a network transmission delay is higher than total service transmission delay that the service can tolerate according to the service real-time requirement information, generate a handover policy without data forwarding processing in the event of handover.

In some embodiments of the disclosure, the generation unit is configured to: based on determining that the network transmission delay is lower than total service transmission delay that the service can tolerate according to the service real-time requirement information, but network transmission pressure is greater than a set threshold, generate a handover policy with part of service packets subjected to data forwarding processing and other service packets not subjected to data forwarding processing.

In some embodiments of the disclosure, the handover policy includes whether the user equipment performing a make before break policy or a break before make policy in the event of handover; acquiring network connection capability information of the user equipment by the generation unit before generating a handover policy to be followed by an access network entity connected to the user equipment in the event of handover, where the network connection capability information is used for representing a number of access network entities that can be connected to the user equipment simultaneously.

In some embodiments of the disclosure, the generation unit is configured to: acquire a handover policy already configured in the other network entities; generate a handover policy to be followed by the access network entity in the event of handover according to the service real-time requirement information and the handover policy already configured in the other network entities.

Some embodiments of the disclosure provide a network handover processing apparatus, including: a second receiving unit configured to receive a handover policy from a policy control function entity, the handover policy representing a policy to be followed by an access network entity connected to user equipment in the event of handover, the handover policy being generated by the policy control function entity according to service real-time requirement information provided by an application side upon receiving a notification message from a network data analytics function entity, the service real-time requirement information indicating a timeliness requirement of services processed between the user equipment and the application side, and the notification message being transmitted by the network data analytics function entity after determining that a handover delay of an access network entity connected to the user equipment in the event of handover exceeds a set threshold; a processing unit configured to configure the handover policy to other network entities to enable the other network entities to perform a handover operation based on the handover policy in the event of handover of the access network entity.

In some embodiments of the disclosure, the processing unit is configured to: configure the handover policy to an access and mobility management function entity and the user equipment, to instruct the access and mobility management function entity to update a handover policy for the user equipment and the service packets based on the handover policy, and to instruct the access and mobility management function entity to configure the handover policy to the connected access network entity.

Some embodiments of the disclosure provide a computer readable medium storing a computer program thereon, the computer program, when executed by a processor, implementing a network handover processing method as described in the foregoing embodiments.

Some embodiments of this application provide an electronic device, including: one or more processors; and a storage apparatus configured to store one or more programs, the one or more programs, when executed by the one or more processors, causing the electronic device to implement the network handover processing method described in the foregoing embodiments.

Some embodiments of this application provide a computer program product or computer program including computer instructions, the computer instructions being stored in a computer readable storage medium. A processor of a computer device reads the computer instructions from the computer readable storage medium, and the processor executes the computer instructions such that the computer device performs the network handover processing method provided in the various optional embodiments described above.

Figure 2:
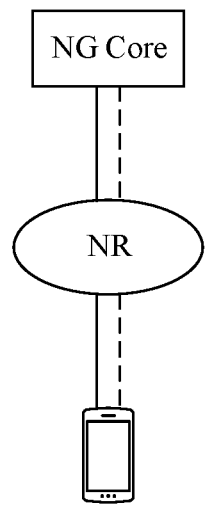
FIG. 2 shows a schematic diagram of one networking mode for the 5G system.

Two networking modes as shown in FIGS. 1 and 2 are proposed in 5G systems. The networking mode shown in FIG. 1 is NSA, i.e., Non-Standalone, and the dashed lines in FIGS. 1 and 2 indicate the control plane, i.e., the channel used to transmit the signaling required to manage and schedule resources; the solid line indicates the user plane, i.e., the channel used to transmit specific data. NSA uses a dual connection approach with the 5G NR (New Radio) control plane anchored to 4G Long Term Evolution (LTE), and requires the use of the 4G Evolved Packet Core (EPC).

The networking mode shown in FIG. 2 is SA, i.e. Standalone, where 5G NR is directly connected to the 5G core network (NR Core), which no longer relies on 4G, and is a complete standalone 5G network.

Figure 3:
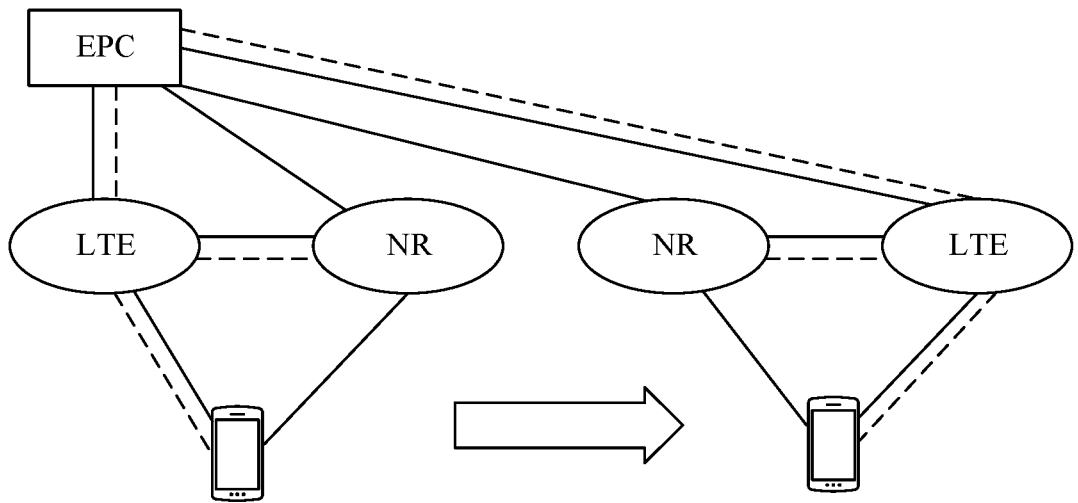
FIG. 3 shows a schematic diagram of a network handover process for the 5G system.

The 5G system also introduces a handover mechanism to enable handover between the access network devices connected to the UE. For Non-Standalone (NSA) mode, because 5G and 4G interoperate at the access network level, it is more complicated to perform the handover, which is due to the fact that 5G NR is anchored to 4G LTE and the handover from NR to NR requires multiple operations to complete if LTE anchoring is changed. Specifically, as shown in FIG. 3, at the time of NR-to-NR handover, the source subcarrier needs to be deleted first to release the source NR resources, and then perform the handover from LTE to LTE, and then add the target subcarrier and newly allocate the target NR resources, so the whole process is tedious and has a large delay.

Figure 4:
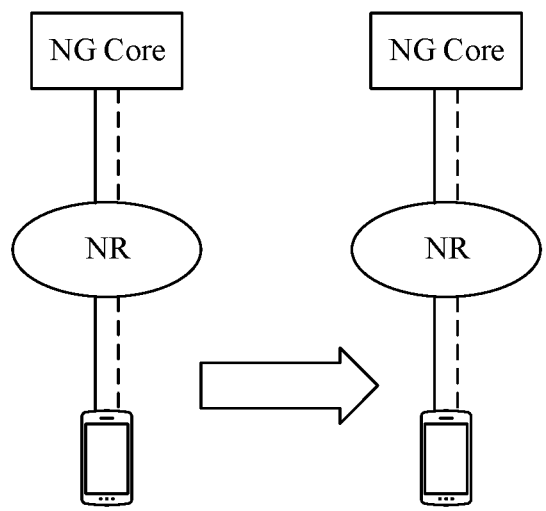
FIG. 4 shows a schematic diagram of a network handover process for the 5G system.

For the Standalone (SA) mode, as shown in FIG. 4, NR-to-NR handover is independent of LTE handover, which is relatively simple and has a low delay.

Figure 5:
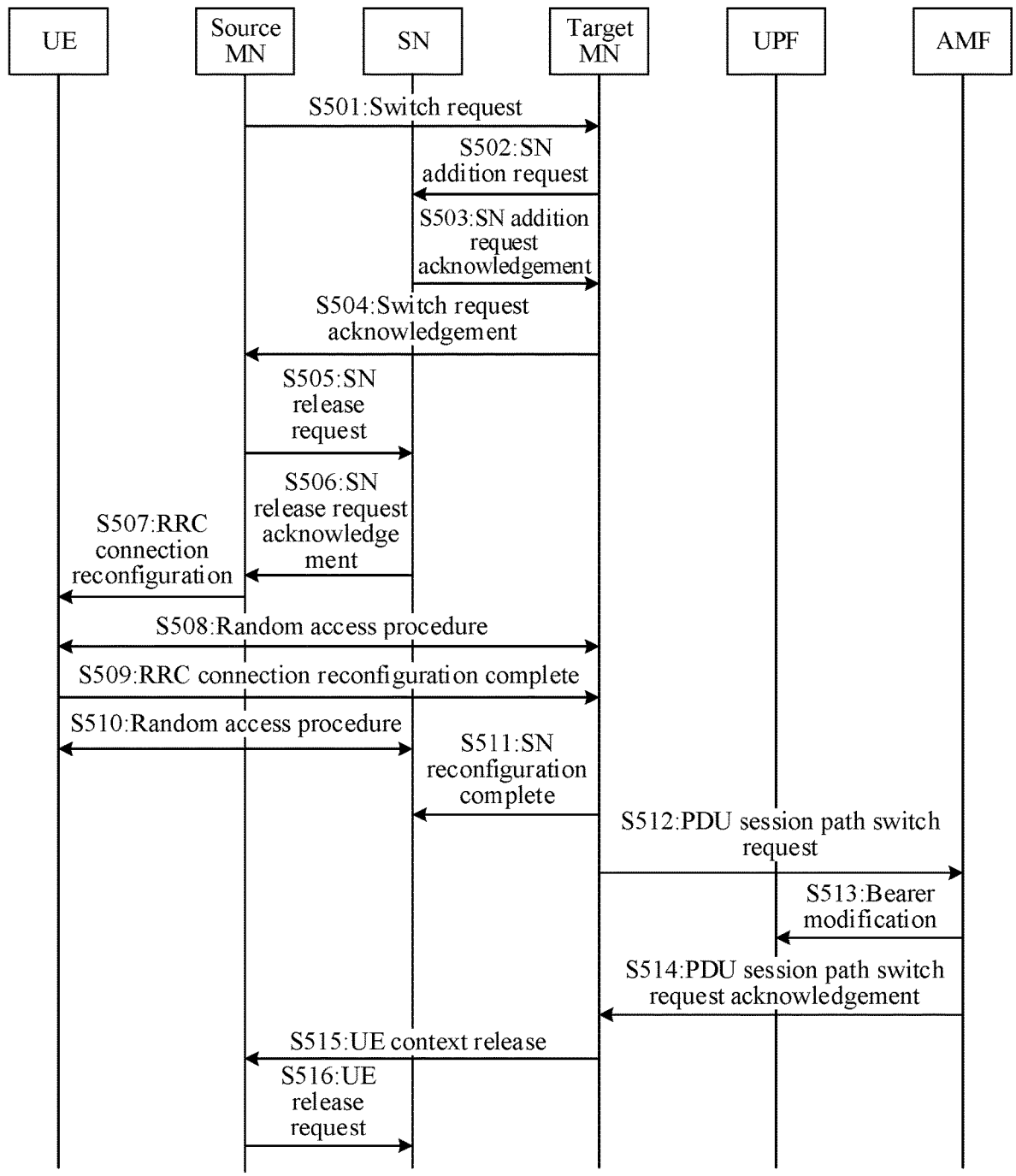
FIG. 5 shows a schematic diagram of a network handover process.

In addition, in order to ensure the handover performance, the handover mechanism based on a dual connection architecture has been proposed in the related technology, i.e., the access network equipment adopts the Master Node (MN) and Secondary Node (SN) architecture, and the SN can remain unchanged during the MN handover, thus ensuring that the data can continue to be forwarded through the SN. The specific process is shown in FIG. 5, including:

S501, the source MN transmits a handover request to the target MN.

S502, the target MN transmits a SN addition request to the SN.

S503, the SN feeds back the SN addition request acknowledgement (ACK) message to the target MN.

S504, the target MN transmits a handover request ACK message to the source MN.

S505, the source MN transmits a SN release request to the SN.

S506, the SN transmits a SN release request ACK message to the source MN.

S507, the source MN transmits an RRC (Radio Resource Control) connection reconfiguration message to the UE.

S508, the UE initiates a random access procedure to the target MN.

S509, the RRC connection reconfiguration complete between the UE and the target MN.

S510, the UE initiates a random access procedure to the SN.

S511, the target MN transmits a reconfiguration complete message to the SN.

S512, the target MN transmits a PDU (Protocol Data Unit) session path switch request to the AMF (Access and Mobility Management Function).

S513, the AMF modifies the UPF (User Plane Function) that carries the PDU session, i.e. the bearer modification procedure.

S514, the AMF transmits a PDU session path switch request ACK message to the target MN.

S515, the target MN transmits a UE context release message to the source MN.

S516, the source MN initiates a UE release request to the SN.

In the handover flow shown in FIG. 5, it is necessary to ensure the handover performance by configuring a dual connection, which is costly. Moreover, in some other technical solutions, in order to ensure the handover performance, it is also proposed to ensure data loss-free transmission by caching data and data forwarding mechanism during handover. The data forwarding mechanism is called data forwarding, which is the forwarding of cached data from the base station before handover to the base station after handover, so as to ensure no data loss.

With the development and popularity of real-time multimedia services and services such as Extended Reality (XR) and Augmented Reality (AR), since the transmission rates for real-time multimedia services and services such as XR are high and the cache and amount of data are large, so if caching and data forwarding mechanisms are used indiscriminately for such services, real-time lossless and non-chaotic transmission will lead to high cost of network resources.

However, since there is a transmission interval during the transmission of packets, as long as the handover occurs within the transmission time and the handover delay does not exceed the transmission interval, the handover performance is not affected. In this case, seeking a too low handover delay is unhelpful for the improvement of user experience at the application layer, but wastes network resources.

Figure 6:
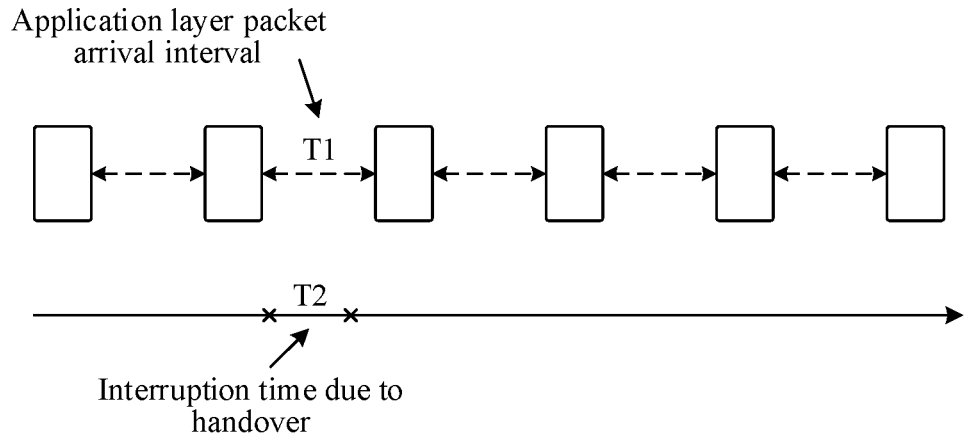
FIG. 6 shows a schematic diagram of the transmission interval of data packets and the interruption time due to handover.

Specifically, as shown in FIG. 6, the packet transmission interval (i.e., arrival interval) is T1, and the interruption time due to handover is T2. As long as the handover occurs within the packet transmission interval and T2<T1, the service side characteristics are not affected. Therefore, it is not worth to reduce the handover interruption delay optimization to a cost less than T2; all these handover mechanisms occupy additional resources and are too costly.

At the same time, if real-time multimedia services and services such as XR have a very strong realtime themselves, the data that is transmitted in the network for more than a certain period of time is no longer valuable to the receiving side, and in this case, it is unnecessary for such data to be cached and data forwarded. Therefore, no additional resources are needed to be occupied to reduce the impact of handover interruptions on this data.

On this basis, some embodiments of the disclosure propose a new network handover processing scheme, which can flexibly adjust the handover policy to be followed by the access network entity in the event of handover according to the service real-time requirement information, and thus can ensure that the handover policy matches the actual service real-time requirement information, and avoid incurring larger handover costs.

The implementation details of the technical solution of some embodiments of this application are described in detail below.

Figure 7:
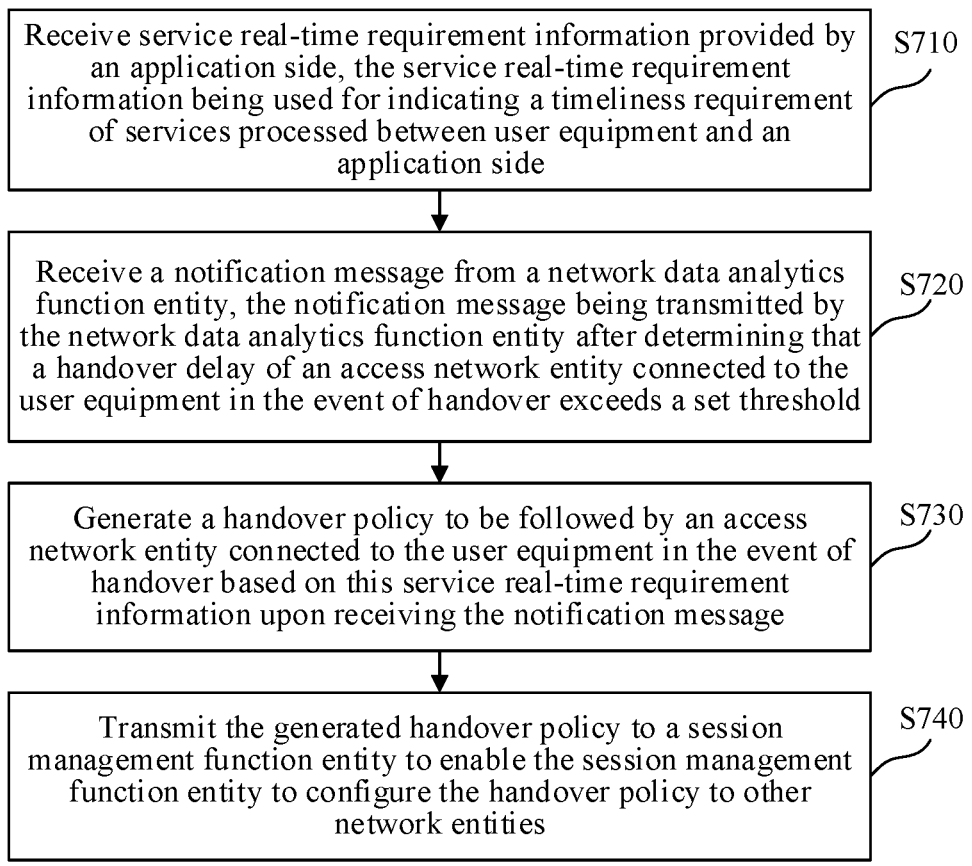
FIG. 7 shows a flowchart of a network handover processing method according to some embodiments.

FIG. 7 shows a flowchart of a network handover processing method according to some embodiments of this application, which can be performed by a Policy Control Function (PCF) entity as an executing body, and the Policy Control Function entity is hereinafter referred to as PCF.

In some embodiments, an electronic device that implements the Policy Control Function (PCF) entity may be a server, which may be a standalone physical server, a server cluster or distributed system consisting of multiple physical servers, and a cloud server that provides fundamental cloud computing services such as cloud services, cloud database, cloud computing, cloud functions, cloud storage, network services, cloud communication, middleware services, domain name services, security services, CDN, and big data and artificial intelligence platforms. The user equipment as well as the server can be connected directly or indirectly by wired or wireless communication, which is not limited in some embodiments of the disclosure.

Referring to FIG. 7, the network handover processing method includes at least S710 through S740, as detailed below:

In S710, service real-time requirement information provided by an application side is received, where the service real-time requirement information is used for indicating a timeliness requirement of services processed between user equipment and an application side.

In some embodiments of the disclosure, the application side may be an Application Function (AF), or an Application Server (AS). If mutual trust is reached through negotiation between the application side and the PCF, the application side can transmit the service real-time requirement information to the PCF directly, i.e., the PCF can receive the service real-time requirement information directly from the application side. If there is no mutual trust between the application side and the PCF, the application side can transmit the service real-time requirement information to the Network Exposure Function (NEF), which then forwards the information to the PCF, i.e., the PCF can receive the service real-time requirement information forwarded by the NEF from the application side.

For example, user equipment can be smartphones, tablets, laptops, desktop computers, smart speakers, smart watches, smart homes, vehicle terminals, etc., but are not limited thereto.

In some embodiments of the disclosure, the service real-time requirement information includes at least one of the following: total service transmission delay that can be tolerated, and valid time of transmitted service packets.

For example, the total service transmission delay that can be tolerated is the maximum delay that the service can tolerate during the whole transmission process, and if this maximum delay is exceeded, it means that there's no point in continuing to transmit service packets. The maximum delay that the service can tolerate during the whole transmission process can be set specifically according to the actual requirements of the service scenario.

For example, the valid time of the service packet is used to represent the length of time that the service packet is in a valid state, and if the valid time is exceeded, it means that the service packet is invalid. The length of time that the service packet is in a valid state can be determined specifically according to the real-time requirements of the service scenario.

In S720, a notification message is received from a network data analytics function entity, where the notification message is transmitted by the network data analytics function entity after determining that a handover delay of an access network entity connected to the user equipment in the event of handover exceeds a set threshold.

In some embodiments of the disclosure, the Network Data Analytics Function (NWDAF) entity is a data-aware analytic network element, and is capable of automatically perceiving and analyzing the network on the basis of network data. Specifically, the NWDAF can collect raw data from core network elements, AFs, Operation Administration and Maintenance (OAM) systems, etc., and perform intelligent analysis on the raw data and output the analysis data for network and service optimization. For example, the NWDAF can evaluate and analyze different types of services using reliable network performance analysis and prediction models by collecting information such as network performance, region-specific service load, and service experience, to build service images, and determine the inherent correlation between the quality of experience (QoE) and service paths, 5G quality of service (QoS), etc.

The NWDAF enables the PCF to request or subscribe to relevant analysis data and acquire notifications, i.e., the PCF can transmit to the network data analytics function entity a message for subscription services, the network data analytics function entity in turn can transmit a notification message to the PCF when it determines through analysis that a handover delay of an access network entity connected to the user equipment in the event of handover exceeds a set threshold. In other words, the NWDAF can transmit a notification message to the PCF to inform the PCF to generate a new handover policy, when it can determine that the current handover policy cannot meet the real-time requirement information of the service (i.e., a handover delay of an access network entity connected to the user equipment in the event of handover exceeds a set threshold).

In some embodiments of the disclosure, when a handover delay in the event of handover exceeds a set threshold, the NWDAF is used to provide the PCF with the detection service for service requirement information in real time, which enables the PCF to determine the handover policy more accurately, thereby saving the computational resources required for the PCF to determine the handover policy, facilitating to improve the efficiency of network handover, reducing the data cache resources consumed during network handover, and reducing the cost of the network handover process.

For example, if in the case of a 5G network, the access network entity can be a NR base station. If in the case of a 4G network, the access network entity can be an LTE base station.

In S730, a handover policy to be followed by an access network entity connected to the user equipment in the event of handover is generated based on this service real-time requirement information upon receiving the notification message.

In some embodiments of the disclosure, the handover policy includes at least one of the following: handover policy 1, i.e. whether data forwarding processing is required in the event of handover; handover policy 2, i.e. a handover delay that can be tolerated in the event of handover; handover policy 3, i.e. context transfer requirements for the source and destination sides in the event of handover, the context transfer requirements including a full configuration, a partial configuration or a delta configuration; handover policy 4, i.e. whether the user equipment performing a make before break policy or a break before make policy in the event of handover. The labeling of each handover policy is for ease of differentiation and explanation only, and does not represent the order of execution of each handover policy.

For example, for handover policy 1, it means whether data forwarding processing is required. For example: If it is determined that data forwarding is not required based on the real-time service requirements, the data forwarding is also unhelpful for the real-time service and causes wastage of resources, in which case the data forwarding processing is not necessary.

For handover policy 2, the handover delay that can be tolerated in the event of handover is used to represent the maximum delay requirement during handover, i.e., the maximum delay during handover will be less than or equal to the handover delay that can be tolerated.

For handover policy 3, context transfer requirements for the source and destination sides in the event of handover can include a full configuration, a partial configuration or a delta configuration.

For handover policy 4, the types of policies performed by the user equipment in the event of handover include: a make before break, and a break before make. If a make before break policy is performed, the smoothness of the handover process can be ensured, but it requires the UE to have the ability to connect multiple access network devices simultaneously. For example, the make before break and break before make policies can be based on a dual connection architecture (i.e., the access network device adopts the architecture of MN and SN) or a non-dual connection architecture, in addition to which the technical solution of some embodiments of the disclosure are applicable not only to the dual-connect architecture but also to the non-dual-connect architecture.

In some embodiments of the disclosure, by determining at least one handover policy based on the service real-time requirement information and executing the corresponding handover policy in the event of network handover, the efficiency of network handover is improved, the data cache resources consumed by network handover are saved, data loss during network handover is avoided, the smoothness of network handover is improved, and the stability of network connection is ensured.

In some embodiments of the disclosure, the process of generating the handover policy can be generating a handover policy containing time thresholds corresponding to each network entity based on the service real-time requirement information, to instruct each network entity to discard the cached data and stop data forwarding processing after monitoring that the handover duration exceeds a corresponding time threshold.

For example, each handover policy may include access network entities, AMFs, SMFs, etc., for example: if the time threshold corresponding to the generated access network entity is 30 milliseconds, then if the access network entity monitors that the handover duration exceeds 30 milliseconds, it means that there's no point in continuing to cache service packets, so the cached data can be discarded and no data forwarding processing is required.

In some embodiments of the disclosure, if the network transmission delay is determined to be higher than total service transmission delay that the service can tolerate according to the service real-time requirement information, a handover policy without data forwarding processing in the event of handover is generated. In some embodiments, since the network transmission delay is higher than total service transmission delay that the service can tolerate, it means that even if the service packets are cached and subjected to data forwarding processing during handover, there is no point for the receiver side, so a handover policy without data forwarding processing can be generated.

In some embodiments of the disclosure, if the network transmission delay is determined to be lower than total service transmission delay that the service can tolerate according to the service real-time requirement information, but network transmission pressure is greater than a set threshold, a handover policy with part of service packets subjected to data forwarding processing and other service packets not subjected to data forwarding processing is generated. In some embodiments, when the network transmission delay is lower than total service transmission delay that the service can tolerate, if network transmission pressure is high, part of service packets can be subjected to data forwarding processing and other service packets not subjected to data forwarding processing, so that the network transmission pressure is relieved as much as possible provided that normal data forwarding processing of important data packets is ensured.

In some embodiments of the disclosure, through the above handover policy, the network transmission pressure during the network handover is relieved, the smoothness of network handover is improved, and the stability of network connection is ensured.

For example, the service packets subjected to data forwarding processing may be those with higher importance, such as key frames (e.g. I-frames); the service packets not subjected to data forwarding processing may be those with lower importance, such as key frames (e.g. P-frames).

In some embodiments of the disclosure, if the generated handover policy includes whether the user equipment performing a make before break policy or a break before make policy in the event of handover, then before generating the handover policy, it is necessary to acquire the network connectivity information of the user equipment, the network connectivity information being used to represent a number of access network entities that can be connected to the user equipment simultaneously.

In some embodiments of the disclosure, when the handover policy is generated, it is also possible to acquire a handover policy already configured in other network entities, and then generate a handover policy to be followed by the access network entities in the event of handover according to the service stream feature information and the handover policy already configured in other network entities. For example, according to the service stream feature information and the handover policy configured in other network entities, it is determined whether the handover policy already configured in other network entities is to be updated, and if the update is required, a new handover policy is regenerated.

In S740, the generated handover policy is transmitted to a session management function entity to enable the session management function entity to configure the handover policy to other network entities.

For example, other network entities may include AMFs, access network entities (e.g., base station equipment), and user equipment, etc. Specifically, the PCF can transmit the generated handover policy to the SMF, which then transmits the policy to the AMF, which in turn can configure the handover policy to the access network entities and user equipment. In some embodiments of the disclosure, the handover policy can be a handover policy that includes a handover policy for each network entity or a handover policy for the network entity as a whole.

Figure 8:
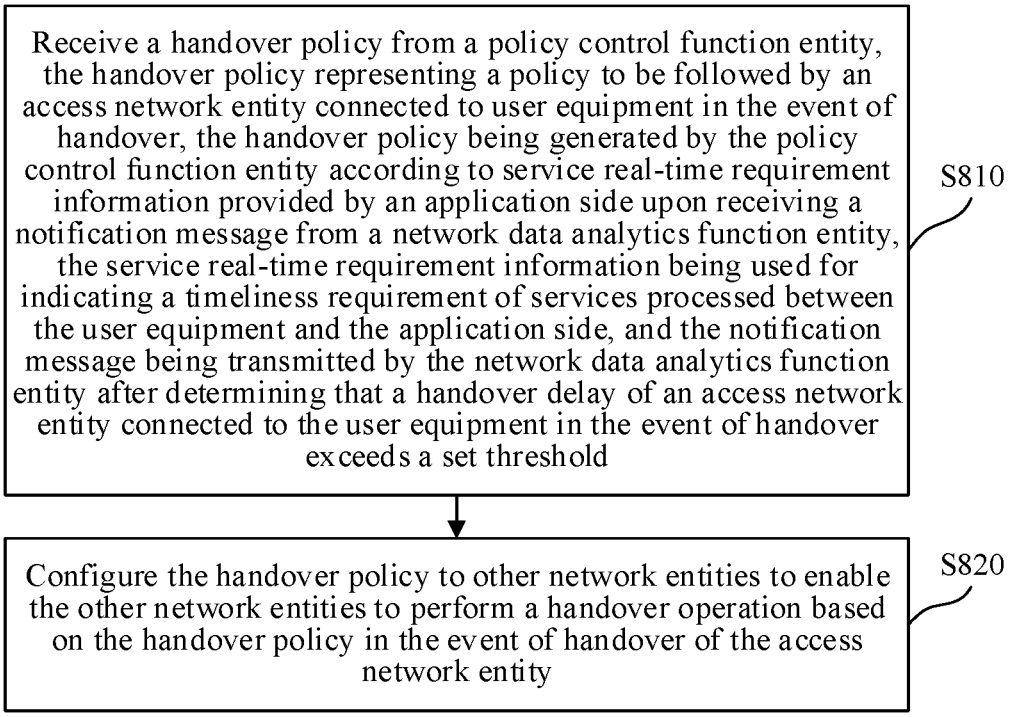
FIG. 8 shows a flowchart of a network handover processing method according to some embodiments.

FIG. 8 shows a flowchart of a network handover processing method according to some embodiments of the disclosure, which may be performed by a session management function entity. Referring to FIG. 8, the network handover processing method includes at least S810 through S820, as detailed below:

In S810, a handover policy is received from a policy control function entity, where the handover policy represents a policy to be followed by an access network entity connected to user equipment in the event of handover, the handover policy is generated by the policy control function entity according to service real-time requirement information provided by an application side upon receiving a notification message from a network data analytics function entity, the service real-time requirement information is used for indicating a timeliness requirement of services processed between the user equipment and the application side, and the notification message is transmitted by the network data analytics function entity after determining that a handover delay of an access network entity connected to the user equipment in the event of handover exceeds a set threshold.

In some embodiments of the disclosure, the service real-time requirement information includes at least one of the following: total service transmission delay that can be tolerated, and valid time of transmitted service packets.

In some embodiments of the disclosure, the handover policy includes at least one of the following: whether data forwarding processing is required in the event of handover; a handover delay that can be tolerated in the event of handover; context transfer requirements for the source and destination sides in the event of handover, the context transfer requirements including a full configuration, a partial configuration or a delta configuration; whether the user equipment performing a make before break policy or a break before make policy in the event of handover.

For specific descriptions of handover policies and service stream feature information, please refer to the technical solutions of the preceding embodiments which will not be repeated.

In S820, the handover policy is configured to other network entities to enable the other network entities to perform a handover operation based on the handover policy in the event of handover of the access network entity.

Specifically, the session management function entity may configure the handover policy to the access and mobility management function entity and the user equipment, and then the access and mobility management function entity updates the handover policy for the user equipment and the service packets based on the handover policy, and configures the handover policy to the connected access network entity, which may be an access network entity before and after handover.

The technical solution of some embodiments of the disclosure can flexibly adjust the handover policy to be followed by the access network entity in the event of handover according to the service real-time requirement information, and thus can ensure that the handover policy matches the actual service real-time requirement information, and avoid incurring larger handover costs. Synchronizing the handover policy configuration to other network entities maintains the consistency of the handover policy among network entities, improves the smoothness of network handover performed by network entities, and ensures the stability of the network.

Figure 9:
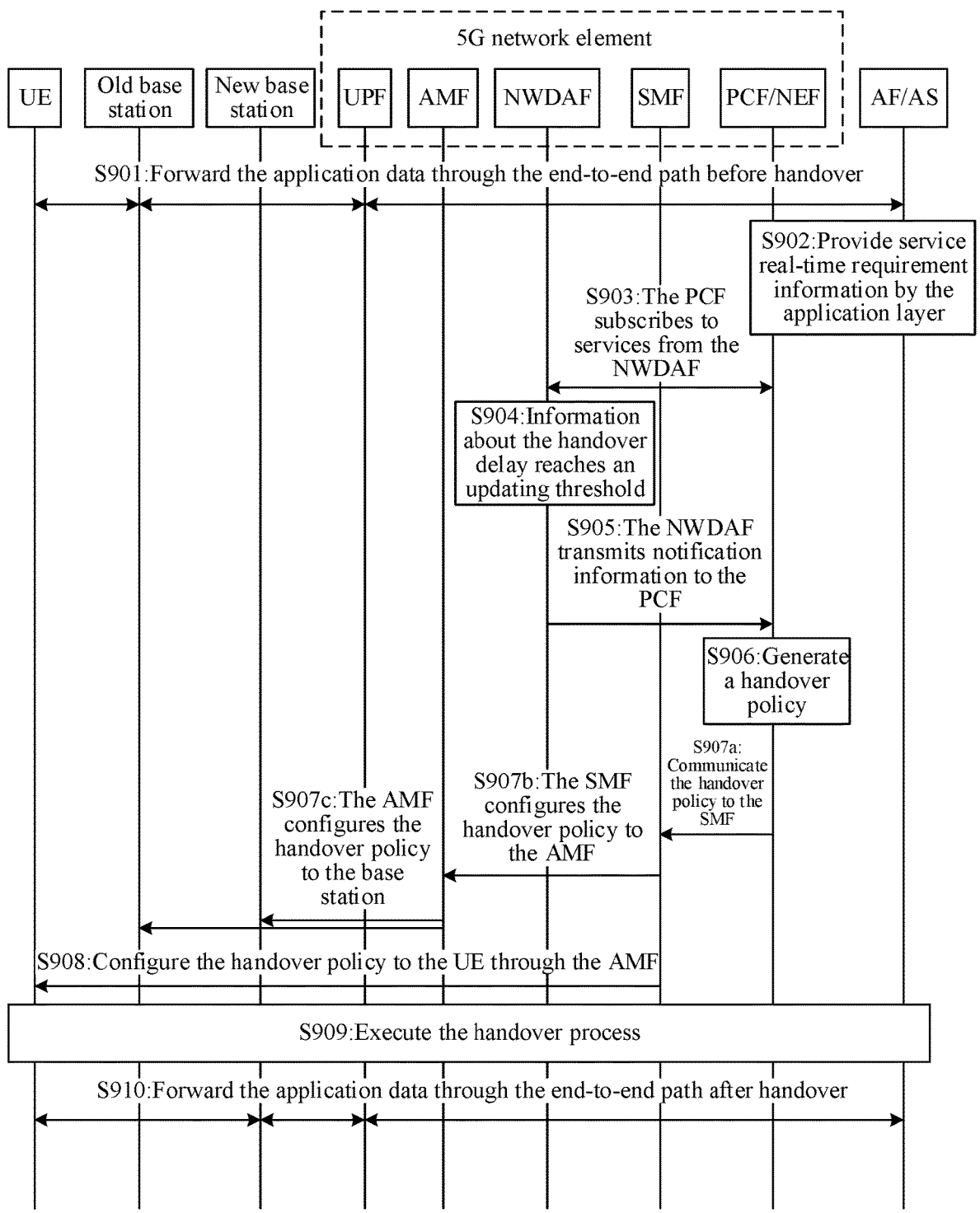
FIG. 9 shows a flowchart of a network handover processing method according to some embodiments.

Specifically, for multimedia services and services such as XR and AR, considering their huge bandwidth, large resources are required for caching or data forwarding. Therefore, through the interaction between the application side and the network side, service real-time requirement information is acquired, and this parameter is provided to the control plane network element to form a respective handover policy. The implementation details of the technical solution of some embodiments of the disclosure are elaborated below in conjunction with FIG. 9, with a 5G network as an example, and specifically include the following operations:

S901, the application data is forwarded through the end-to-end path before handover. Specifically, the UE is connected to the UPF through the old base station, and then connected to the application server through the UPF. In some embodiments shown in FIG. 9, the AF and the AS are drawn together; in fact, the two are a control-plane network element and a user-plane network element, respectively, or can be deployed separately.

S902, the service real-time requirement information is acquired through the interaction between the application side and the network side.

For example, in some embodiments of the disclosure, if mutual trust is reached through negotiation, etc., between the AF/AS and the 5GC (5G Core, 5G core network), the AF/AS can transmit the service real-time requirement information directly to the 5GC network elements, such as the PCF.

If the AF/AS and the 5GC are not mutually trusted entities, the AF/AS can provide the service real-time requirement information to the 5GC network element NEF, which then forwards the information to the PCF.

For example, the service real-time requirement information includes, but is not limited to: total service transmission delay that the service can tolerate, and valid time of transmitted service packets.

S903, the PCF subscribes to services from the NWDAF to enable the NWDAF to perform statistical analysis on the handover delay of the network environment in which the UE is located.

S904, the NWDAF analyzes and obtains that the handover delay information reaches an updating threshold by acquiring information from different network elements. In other words, the NWDAF can determine that the current handover policy cannot meet the real-time requirement information of the service, i.e., the handover delay information of an access network entity connected to the user equipment in the event of handover reaches an updating threshold.

S905, the NWDAF transmits a notification message to the PCF to inform the PCF to generate a new handover policy.

S906, the PCF generates a respective handover policy according to the obtained service real-time requirement information, as well as information from other 5GC network elements.

For example, information from other 5GC network elements includes, but is not limited to, handover policy information of specific UEs already configured on network elements such as SMFs and AMFs.

For example, the handover policy includes at least one of the following: whether data forwarding processing is required in the event of handover; a handover delay that can be tolerated in the event of handover; context transfer requirements for the source and destination sides in the event of handover, the context transfer requirements including a full configuration, a partial configuration or a delta configuration; whether the user equipment performing a make before break policy or a break before make policy in the event of handover. The handover policy may also include: when a respective network element (e.g., access network entity) monitors that the handover delay time exceeds a specific value, the cached packets are discarded and no caching and data forwarding processing is performed.

Data forwarding processing may or may not be required. For example: if it is determined that data forwarding is not required based on the real-time service requirements, the data forwarding is also unhelpful for the real-time service and causes wastage of resources, in which case the data forwarding processing is not necessary.

The handover delay that can be tolerated in the event of handover is used to represent the maximum delay requirement during handover, i.e., the maximum delay during handover will be less than or equal to the handover delay that can be tolerated. The context transfer requirements for the source and destination sides in the event of handover can include a full configuration, a partial configuration and a delta configuration.

By "make before break" we mean a new connection is made before breaking an existing one, and by "break before make" we mean an existing connection is broken before making a new connection. If in the case of a make before break policy, the smoothness of the handover process can be ensured, but the UE may be required to have the ability to connect multiple access network devices simultaneously.

In some embodiments of the disclosure, if the network transmission delay is determined to be higher than total service transmission delay that the service can tolerate according to the service real-time requirement information, a handover policy without data forwarding processing in the event of handover is generated. In some embodiments, since the network transmission delay is higher than total service transmission delay that the service can tolerate, it means that even if the service packets are cached and subjected to data forwarding processing during handover, there is no point for the receiver side, so a handover policy without data forwarding processing can be generated.

In some embodiments of the disclosure, if the network transmission delay is determined to be lower than total service transmission delay that the service can tolerate according to the service real-time requirement information, but network transmission pressure is greater than a set threshold, a handover policy with part of service packets subjected to data forwarding processing and other service packets not subjected to data forwarding processing is generated. In some embodiments, when the network transmission delay is lower than total service transmission delay that the service can tolerate, if network transmission pressure is high, part of service packets can be subjected to data forwarding processing and other service packets not subjected to data forwarding processing, so that the network transmission pressure is relieved as much as possible provided that normal data forwarding processing of important data packets is ensured.

In some embodiments of the disclosure, when a handover policy is generated, according to the service stream feature information and the handover policy already configured in other network entities, it can be determined whether the handover policy already configured in other network entities is to be updated, and if so, a new handover policy is regenerated.

S907, the generated handover policy is configured from the PCF to the AMF and the base station.

Specifically, in S907a, the PCF configures the handover policy to the SMF; in S907b, the SMF configures the handover policy to the AMF, and the handover policy in the AMF regarding that particular UE and particular service needs to be updated after configuration; in S907c, the AMF configures the handover policy to the base stations (including the old base station and the new base station), and this operation configures or updates the context information of the gNB, which thereby affects the handover policy of the UE.

S908, the handover policy generated for that particular UE is configured to the UE through the AMF. The handover policy configured on the UE affects respective caching and data forwarding policies.

S909, the handover process is executed according to the configured policy. The handover process updates the handover policy configuration, i.e., with or without data caching and forwarding, whether or not to require lossless handover, etc.

S910, the application data is forwarded through the end-to-end path after handover. Specifically, the UE is connected to the UPF through the new base station, and then is connected to the Application Server through the UPF.

The technical solution of some embodiments of the disclosure can solve the problem of the high cost of network resources due to the large amount of caching and data forwarding commonly found in real-time multimedia services and services such as XR, and can save the cost of data caching and forwarding operations required for lossless handover. For example, if the forwarding time of service packets has exceeded a threshold, or if it can be determined that there is no need to decode the packets even if they are cached and forwarded (e.g., the valid time is exceeded), the caching and data forwarding processing of the service packets can be eliminated, which in turn can save the cost of data caching and forwarding operations required for lossless handover.

The following introduces some embodiments of the apparatus of the disclosure which may be used for performing the network handover processing method in the foregoing embodiments of the disclosure. For details not disclosed in some embodiments of the apparatus of the disclosure, please refer to the above network handover processing method in the disclosure.

Figure 10:
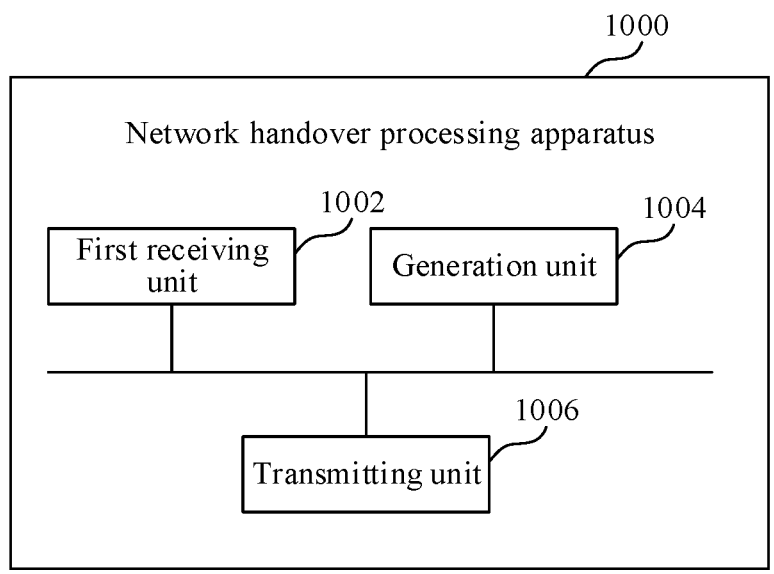
FIG. 10 shows a block diagram of a network handover processing apparatus according to some embodiments.

FIG. 10 shows a block diagram of a network handover processing apparatus according to some embodiments of the disclosure, which may be provided within a policy control function entity.

Referring to FIG. 10, a network handover processing apparatus 1000 according to some embodiments of the disclosure include: a first receiving unit 1002, a generation unit 1004, and a transmitting unit 1006.

The first receiving unit 1002 is configured to receive service real-time requirement information provided by an application side and to receive a notification message from a network data analytics function entity, where the service real-time requirement information is used for indicating a timeliness requirement of services processed between the user equipment and the application side, the service real-time requirement information is generated by the network data analytics function entity according to an analysis of the service, and the notification message is transmitted by the network data analytics function entity after determining that a handover delay of an access network entity connected to the user equipment in the event of handover exceeds a set threshold; the generation unit 1004 is configured to generate, based on the service real-time requirement information, a handover policy to be followed by an access network entity connected to the user equipment in the event of handover upon receiving the notification message; the transmitting unit 1006 is configured to transmit the handover policy to a session management function entity to enable the session management function entity to configure the handover policy to other network entities.

In some embodiments of the disclosure, the first receiving unit 1002 is configured to: receive service real-time requirement information forwarded by a network exposure function entity from the application side; or receive service real-time requirement information directly from the application side.

In some embodiments of the disclosure, the handover policy includes at least one of the following:
whether data forwarding processing is required in the event of handover;
a handover delay that can be tolerated in the event of handover;
context transfer requirements for the source and destination sides in the event of handover, the context transfer requirements including a full configuration, a partial configuration or a delta configuration;
whether the user equipment performing a make before break policy or a break before make policy in the event of handover.

In some embodiments of the disclosure, the service real-time requirement information includes at least one of the following: total service transmission delay that can be tolerated, and valid time of transmitted service packets.

In some embodiments of the disclosure, the generation unit 1004 is configured to: generate a handover policy containing time thresholds corresponding to each network entity based on the service real-time requirement information, to instruct said each network entity to discard cached data and stop data forwarding processing after monitoring that the handover duration exceeds a corresponding time threshold.

In some embodiments of the disclosure, the generation unit 1004 is configured to: based on determining that a network transmission delay is higher than total service transmission delay that the service can tolerate according to the service real-time requirement information, generate a handover policy without data forwarding processing in the event of handover.

In some embodiments of the disclosure, the generation unit 1004 is configured to: based on determining that the network transmission delay is lower than total service transmission delay that the service can tolerate according to the service real-time requirement information, but network transmission pressure is greater than a set threshold, generate a handover policy with part of service packets subjected to data forwarding processing and other service packets not subjected to data forwarding processing.

In some embodiments of the disclosure, the handover policy includes whether the user equipment performing a make before break policy or a break before make policy in the event of handover; acquiring network connection capability information of the user equipment by the generation unit 1004 before generating a handover policy to be followed by an access network entity connected to the user equipment in the event of handover, where the network connection capability information is used for representing a number of access network entities that can be connected to the user equipment simultaneously.

In some embodiments of the disclosure, the generation unit 1004 is configured to: acquire a handover policy already configured in the other network entities; generate a handover policy to be followed by the access network entity in the event of handover according to the service real-time requirement information and the handover policy already configured in the other network entities.

Figure 11:
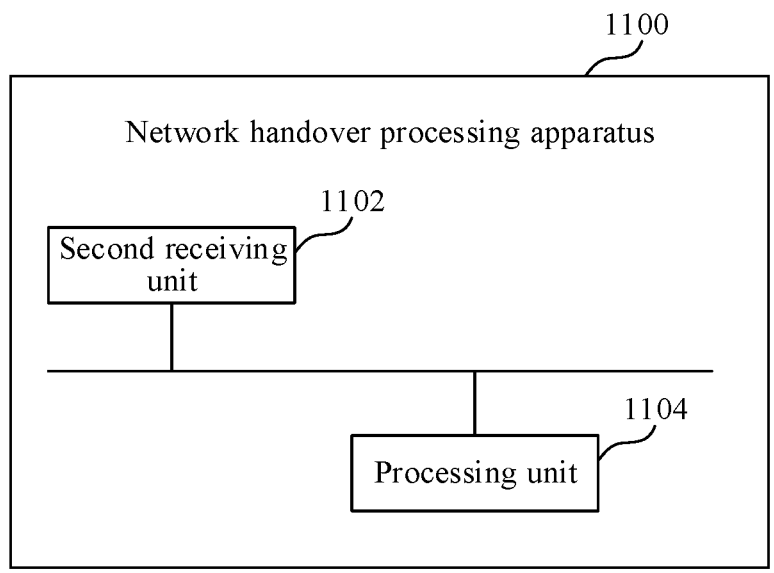
FIG. 11 shows a block diagram of a network handover processing apparatus according to some embodiments.

FIG. 11 shows a block diagram of a network handover processing apparatus according to some embodiments of the disclosure, which may be provided within a session management function entity.

Referring to FIG. 11, a network handover processing apparatus 1100 according to some embodiments of the disclosure include: a second receiving unit 1102 and a processing unit 1104.

The second receiving unit 1102 is configured to receive a handover policy from a policy control function entity, where the handover policy represents a policy to be followed by an access network entity connected to user equipment in the event of handover, the handover policy is generated by the policy control function entity according to service real-time requirement information provided by an application side upon receiving a notification message from a network data analytics function entity, the service real-time requirement information is used for indicating a timeliness requirement of services processed between the user equipment and the application side, and the notification message is transmitted by the network data analytics function entity after determining that a handover delay of an access network entity connected to the user equipment in the event of handover exceeds a set threshold; the processing unit 1104 is configured to configure the handover policy to other network entities to enable the other network entities to perform a handover operation based on the handover policy in the event of handover of the access network entity.

In some embodiments of the disclosure, the processing unit 1104 is configured to: configure the handover policy to an access and mobility management function entity and the user equipment, to instruct the access and mobility management function entity to update a handover policy for the user equipment and the service packets based on the handover policy, and to instruct the access and mobility management function entity to configure the handover policy to the connected access network entity.

Figure 12:
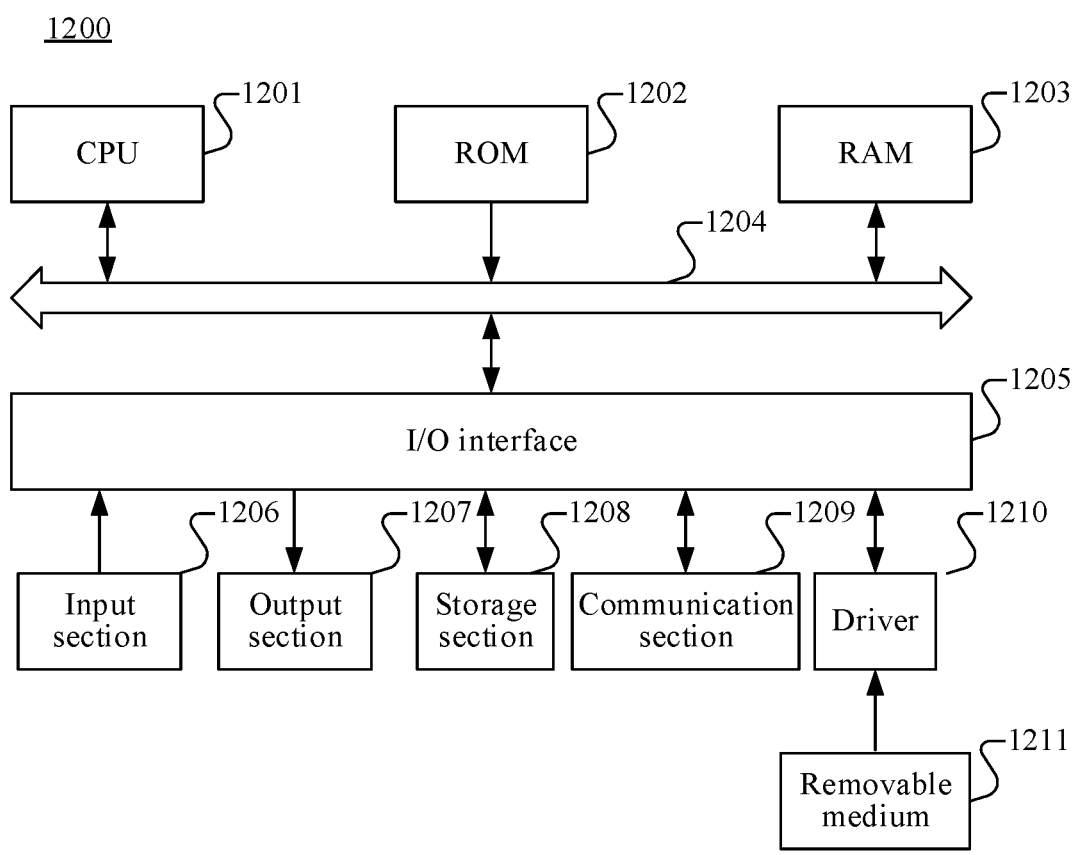
FIG. 12 shows a schematic structural diagram of a computer system adapted to implement an electronic device according to some embodiments.

FIG. 12 shows a schematic structural diagram of a computer system adapted to implement an electronic device according to some embodiments of the disclosure.

The computer system 1200 of the electronic device shown in FIG. 12 is merely one example, and does not constitute any limitation on functions and use ranges of some embodiments of the disclosure.

As shown in FIG. 12, the computer system 1200 includes a central processing unit (CPU) 1201, which may perform various suitable actions and processing (for example, perform the method described in the foregoing embodiments), according to a program stored in a read-only memory (ROM) 1202 or a program loaded from a storage section 1208 into a random access memory (RAM) 1203. The RAM 1203 further stores various programs and data required for system operations. The CPU 1201, the ROM 1202, and the RAM 1203 are connected to each other through a bus 1204. An input/output (I/O) interface 1205 is also connected to the bus 1204.

The following components are connected to the I/O interface 1205: an input section 1206 including keyboard, mouse, etc; an output section 1207 including such as Cathode Ray Tube (CRT), Liquid Crystal Display (LCD), etc., and speakers; a storage section 1208 including hard drives, etc; and a communication section 1209 including network interface cards such as LAN (Local Area Network) cards, modems, etc. The communication section 1209 performs communication processing over a network such as the Internet. A driver 1210 is also connected to the I/O interface 1205 as required. A removable medium 1211, such as a magnetic disk, an optical disc, a magneto-optical disk, or a semiconductor memory, is installed on the driver 1210 as required, so that a computer program read from the removable medium is installed into the storage section 1208 as required.

Particularly, according to some embodiments of the disclosure, the processes described above with reference to the flowchart may be implemented as computer software programs. For example, some embodiments of the disclosure includes a computer program product. The computer program product includes a computer program carried in a computer readable medium. The computer program includes a computer program used for performing a method shown in the flowchart. In such some embodiments, the computer program may be downloaded and installed from a network through the communication section 1209, and/or installed from the removable medium 1211. When the computer program is executed by the Central Processing Unit (CPU) 1201, the various functions defined in the system of the disclosure are executed.

The computer readable medium shown in some embodiments of the disclosure may be a computer readable signal medium or a computer readable storage medium or any combination of the two. The computer-readable storage medium may be, for example, but is not limited to, an electric, magnetic, optical, electromagnetic, infrared, or semi-conductive system, apparatus, or component, or any combination of the above. More specific examples of computer-readable storage media may include, but are not limited to: an electrical connection having one or more wires, a portable computer magnetic disk, a hard disk, a random access memory (RAM), a read-only memory (ROM), an erasable programmable read-only memory (EPROM), a flash memory, an optical fiber, a portable compact disk read-only memory (CD-ROM), an optical storage component, a magnetic storage component, or any appropriate combination thereof. In the disclosure, the computer-readable storage medium may be any tangible medium containing or storing a program, and the program may be used by or used in combination with an instruction execution system, an apparatus, or a component. In the disclosure, the computer-readable signal medium may include a data signal propagated in a baseband or as part of a carrier, and carries a computer-readable computer program therein. A data signal propagated in such a way may assume a plurality of forms, including, but not limited to, an electromagnetic signal, an optical signal, or any appropriate combination thereof. The computer readable signal medium may also be any computer readable medium in addition to a computer readable storage medium. The computer readable medium may send, propagate, or transmit a program that is used by or used in conjunction with an instruction execution system, an apparatus, or a component. Computer programs contained on computer readable media can be transmitted using any appropriate medium, including but not limited to: wireless, wired, etc., or any suitable combination of the above.

The flowcharts and block diagrams in the accompanying drawings illustrate possible system architectures, functions and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may in some embodiments occur in a sequence different from that annotated in the accompanying drawings. For example, actually two boxes shown in succession may be performed basically in parallel, and sometimes the two boxes may be performed in a reverse sequence. This is determined by a related function. It is also to be explained that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in some embodiments of the disclosure may be implemented in a software manner, or may be implemented in a hardware manner, and the unit described can also be provided in a processor. The names of these units do not constitute a limitation on the units themselves in certain circumstances.

As another aspect, the disclosure also provides a computer readable medium which may be contained in the electronic device described in the foregoing embodiments; It can also be separate and not assembled into the electronic device. The computer readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of the disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented in software, or may be implemented in a combination of software and necessary hardware. Therefore, the technical solutions of some embodiments of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to some embodiments of the disclosure.

After considering the specification and practicing the implementations of the present disclosure, persons skilled in the art may easily conceive of other implementations of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure.

It is to be understood that the disclosure is not limited to the precise structures described above and shown in the accompanying drawings, and various modifications and changes can be made without departing from the scope of the disclosure. The scope of the disclosure is subject only to the appended claims.

What is claimed is:

1. A network handover processing method, executed by an electronic device, comprising:
   receiving service real-time requirement information provided by an application side, the service real-time requirement information indicating a timeliness requirement of services processed between user equipment and the application side;
   receiving a notification message from a network data analytics function entity, the notification message having been transmitted by the network data analytics function entity after determining that a handover delay of an access network entity connected to the user equipment in the event of handover exceeds a set threshold;
   generating, based on the service real-time requirement information, a handover policy to be followed by an access network entity connected to the user equipment in the event of handover upon receiving the notification message; and
   transmitting the handover policy to a session management function entity.

2. The network handover processing method according to claim 1, wherein receiving service real-time requirement information provided by an application side comprises:
   receiving service real-time requirement information forwarded by a network exposure function entity from the application side; or
   receiving service real-time requirement information directly from the application side.

3. The network handover processing method according to claim 1, wherein the handover policy comprises at least one of the following:
   whether data forwarding processing is required in the event of handover;
   a handover delay that can be tolerated in the event of handover;
   context transfer requirements for the source and destination sides in the event of handover, the context transfer requirements including a full configuration, a partial configuration or a delta configuration;

whether the user equipment performing a make before break policy or a break before make policy in the event of handover.

4. The network handover processing method according to claim 1, wherein the service real-time requirement information comprises at least one of the following: total service transmission delay that can be tolerated, and valid time of transmitted service packets.

5. The network handover processing method according to claim 1, wherein the generating comprises:
generating a handover policy containing time thresholds corresponding to each network entity based on the service real-time requirement information, to instruct said each network entity to discard cached data and stop data forwarding processing after monitoring that the handover duration exceeds a corresponding time threshold.

6. The network handover processing method according to claim 1, wherein the generating comprises:
based on determining that a network transmission delay is higher than total service transmission delay that the service can tolerate according to the service real-time requirement information, generate a handover policy without data forwarding processing in the event of handover.

7. The network handover processing method according to claim 1, wherein the generating comprises:
based on determining that the network transmission delay is lower than total service transmission delay that the service can tolerate according to the service real-time requirement information, but network transmission pressure is greater than a set threshold, generate a handover policy with part of service packets subjected to data forwarding processing and other service packets not subjected to data forwarding processing.

8. The network handover processing method according to claim 1, wherein the handover policy further comprises whether the user equipment performing a make before break policy or a break before make policy in the event of handover;
before generating, based on the service real-time requirement information, a handover policy to be followed by an access network entity connected to the user equipment in the event of handover, the network handover processing method further comprises:
acquiring network connection capability information of the user equipment, wherein the network connection capability information is used for representing a number of access network entities that can be connected to the user equipment simultaneously.

9. The network handover processing method according to claim 1, wherein the generating comprises:
acquiring a handover policy already configured in the other network entities;
generating a handover policy to be followed by the access network entity in the event of handover according to the service real-time requirement information and the handover policy already configured in the other network entities.

10. The network handover processing method according to claim 1,
wherein the session management function entity configures the handover policy to other network entities to enable the other network entities to perform a handover operation based on the handover policy in the event of handover of the access network entity, and wherein the configuring comprises configuring the handover policy to an access and mobility management function entity and the user equipment, to instruct the access and mobility management function entity to update a handover policy for the user equipment and the service packets based on the handover policy, and to instruct the access and mobility management function entity to configure the handover policy to the connected access network entity.

11. A network handover processing apparatus, comprising:
at least one memory configured to store computer program code; and
at least one processor configured to access the at least one memory and operate according to the computer program code, the computer program code including:
service receiving code configured to cause the at least one processor to receive service real-time requirement information provided by an application side, the service real-time requirement information indicating a timeliness requirement of services processed between user equipment and the application side;
notification receiving code configured to cause the at least one processor to receive a notification message from a network data analytics function entity, the notification message having been transmitted by the network data analytics function entity after determining that a handover delay of an access network entity connected to the user equipment in the event of handover exceeds a set threshold;
generating code configured to cause the at least one processor to generate, based on the service real-time requirement information, a handover policy to be followed by an access network entity connected to the user equipment in the event of handover upon receiving the notification message; and
transmitting code configured to cause the at least one processor to transmit the handover policy to a session management function entity.

12. The network handover processing apparatus according to claim 11, wherein receiving service real-time requirement information provided by an application side comprises:
receiving service real-time requirement information forwarded by a network exposure function entity from the application side; or
receiving service real-time requirement information directly from the application side.

13. The network handover processing apparatus according to claim 11, wherein the handover policy comprises at least one of the following:
whether data forwarding processing is required in the event of handover;
a handover delay that can be tolerated in the event of handover;
context transfer requirements for the source and destination sides in the event of handover, the context transfer requirements including a full configuration, a partial configuration or a delta configuration;
whether the user equipment performing a make before break policy or a break before make policy in the event of handover.

14. The network handover processing apparatus according to claim 11, wherein the service real-time requirement information comprises at least one of the following: total service transmission delay that can be tolerated, and valid time of transmitted service packets.

15. The network handover processing apparatus according to claim 11, wherein the generating comprises:

generating a handover policy containing time thresholds corresponding to each network entity based on the service real-time requirement information, to instruct said each network entity to discard cached data and stop data forwarding processing after monitoring that the handover duration exceeds a corresponding time threshold.

16. The network handover processing apparatus according to claim 11, wherein the generating comprises:

based on determining that a network transmission delay is higher than total service transmission delay that the service can tolerate according to the service real-time requirement information, generate a handover policy without data forwarding processing in the event of handover.

17. The network handover processing apparatus according to claim 11, wherein the generating comprises:

based on determining that the network transmission delay is lower than total service transmission delay that the service can tolerate according to the service real-time requirement information, but network transmission pressure is greater than a set threshold, generating a handover policy with part of service packets subjected to data forwarding processing and other service packets not subjected to data forwarding processing.

18. The network handover processing apparatus according to claim 11, wherein the handover policy further comprises whether the user equipment performing a make before break policy or a break before make policy in the event of handover; and the program code further comprises network code configured to cause the at least one processor to:

acquire network connection capability information of the user equipment, wherein the network connection capability information is used for representing a number of access network entities that can be connected to the user equipment simultaneously; and wherein the generating comprises:

acquiring a handover policy already configured in the other network entities; and generating a handover policy to be followed by the access network entity in the event of handover according to the service real-time requirement information and the handover policy already configured in the other network entities.

19. The network handover processing apparatus according to claim 11, wherein the session management function entity configures the handover policy to other network entities to enable the other network entities to perform a handover operation based on the handover policy in the event of handover of the access network entity, wherein the configuring comprises configuring the handover policy to an access and mobility management function entity and the user equipment, to instruct the access and mobility management function entity to update a handover policy for the user equipment and the service packets based on the handover policy, and to instruct the access and mobility management function entity to configure the handover policy to the connected access network entity.

20. A non-transitory computer readable medium including program code for network handover processing containing instructions that, when executed by at least one processor, cause at least one processor to:

receive service real-time requirement information provided by an application side, the service real-time requirement information indicating a timeliness requirement of services processed between user equipment and the application side;

receive a notification message from a network data analytics function entity, the notification message having been transmitted by the network data analytics function entity after determining that a handover delay of an access network entity connected to the user equipment in the event of handover exceeds a set threshold;

generate, based on the service real-time requirement information, a handover policy to be followed by an access network entity connected to the user equipment in the event of handover upon receiving the notification message; and transmit the handover policy to a session management function entity.

* * * * *